United States Patent
Paessler et al.

(10) Patent No.: US 6,830,231 B2
(45) Date of Patent: Dec. 14, 2004

(54) ELECTROMAGNETICALLY ACTUATED VALVE

(75) Inventors: Wolfgang Paessler, Ottersweier (DE); Bertram Bauer, Gaggenau (DE); Jens Schrader, Buehlertal (DE); Klaus Strassburger, Rheinmuenster (DE)

(73) Assignee: Robert Bosch GmbH, Stuttgart (DE)

( * ) Notice: Subject to any disclaimer, the term of this patent is extended or adjusted under 35 U.S.C. 154(b) by 62 days.

(21) Appl. No.: 09/890,851

(22) PCT Filed: Dec. 2, 2000

(86) PCT No.: PCT/DE00/04296

§ 371 (c)(1),
(2), (4) Date: Sep. 18, 2001

(87) PCT Pub. No.: WO01/42698

PCT Pub. Date: Jun. 14, 2001

(65) Prior Publication Data

US 2002/0134957 A1 Sep. 26, 2002

(30) Foreign Application Priority Data

Dec. 7, 1999 (DE) .................................. 199 58 913.5

(51) Int. Cl.[7] .............................................. F16K 31/02
(52) U.S. Cl. ...................... 251/64; 251/129.16; 335/248
(58) Field of Search ............................. 251/64, 129.15, 251/129.16, 129.17, 129.19, 129.2; 335/193, 247, 248, 249

(56) References Cited

U.S. PATENT DOCUMENTS

| | | | | |
|---|---|---|---|---|
| 4,205,593 A | * | 6/1980 | Sakakibara | ............ 251/129.2 X |
| 4,397,443 A | | 8/1983 | Amano et al. | |
| 4,534,381 A | * | 8/1985 | Hozumi et al. | ....... 251/129.2 X |
| 4,610,425 A | * | 9/1986 | Kelly | ........................ 251/129.2 |
| 4,986,308 A | * | 1/1991 | Champseaux | ........ 251/129.2 X |
| 5,139,226 A | | 8/1992 | Baldwin et al. | |
| 5,337,785 A | * | 8/1994 | Romer | ................ 251/129.2 X |
| 5,484,270 A | * | 1/1996 | Adahan | ....................... 417/415 |
| 5,653,422 A | * | 8/1997 | Pieloth et al. | ............ 251/129.2 |
| 5,683,232 A | * | 11/1997 | Adahan | ....................... 417/440 |
| 5,878,991 A | * | 3/1999 | Krimmer et al. | ... 251/129.15 X |
| 6,019,344 A | * | 2/2000 | Engel et al. | ......... 251/129.01 X |
| 6,073,630 A | * | 6/2000 | Adahan | .................. 128/205.24 |

FOREIGN PATENT DOCUMENTS

| | | |
|---|---|---|
| DE | 7324333 | 9/1973 |
| DE | 33 46 290 A1 | 7/1984 |
| DE | 43 42 566 A1 | 6/1995 |
| DE | 196 11 886 A1 | 10/1997 |
| DE | 197 54 525 C1 | 4/1999 |
| DE | 298 23 478 U1 | 7/1999 |

* cited by examiner

Primary Examiner—Eric Keasel
(74) Attorney, Agent, or Firm—Michael J. Striker

(57) ABSTRACT

The invention relates to an electromagnetically actuatable valve that has a magnet part, a moveable armature element, a spring element, and a valve part. The magnet part has at least one coil form with a magnetic coil wound on it, a flux concentrating element and a center pole. The valve part has a closing element that cooperates with the armature element and controls the opening and closing of the valve on a valve seat. The armature element is designed as a clapper-type armature and cooperates with the center pole by way of a damping element.

9 Claims, 2 Drawing Sheets

ELECTROMAGNETICALLY ACTUATED VALVE

Figure 1:
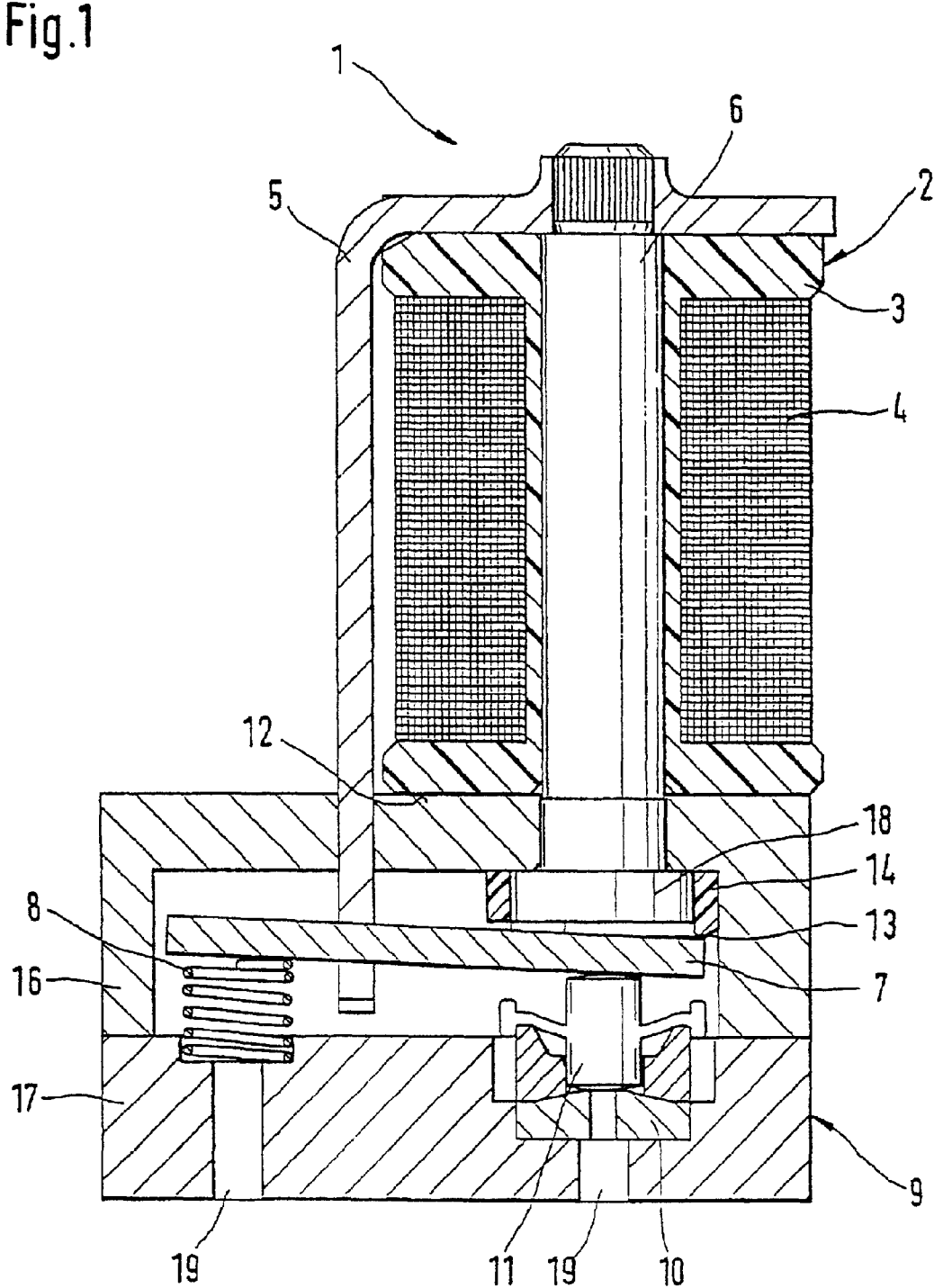

The invention relates to an electromagnetically actuatable valve, in particular for use in motor vehicles according to the preamble of claim 1.

RELATED ART

Electromagnetic valves are made known in the related art, in which the opening and closing of the valve is achieved by means of a moveable solenoid plunger. The disadvantage of this is that, due to the structural arrangement of the components in such valves, an air gap results between coil and center pole, between solenoid plunger and coil, and between solenoid plunger and center pole, which leads to a marked loss of magnetic flux. A further disadvantage of the traditional electromagnetic valves is that, when the valve opens and closes, the solenoid plunger, which is made of iron, strikes the center pole of the magnetic coil and produces a clearly audible noise.

Object of the present invention is to create an electromagnetically actuatable valve of the type described in the preamble of claim 1 that is low-noise or optimized in terms of noise during opening and closing that simultaneously ensures an improved magnetic flux and also saves space.

This object is solved according to the invention using the subject matter of claim 1.

ADVANTAGES OF THE INVENTION

The electromagnetically actuatable valve according to the invention has a magnet part, a moveable armature element, a spring element, and a valve part. The magnet part includes at least one magnetic coil wound on a coil form, a flux concentrating element, and a center pole. The valve part has a closing element that cooperates with the armature element and controls the opening and closing of the valve on a valve seat.

According to the present invention, the armature element of the valve is designed as a clapper-type armature. The use of a clapper-type armature is advantageous, on the one hand, because the entire electromagnetically actuatable valve can then be designed to be smaller in size than when a traditional solenoid plunger is used. This space-saving design of the valve expands its potential uses. On the other hand, the use of a clapper-type armature involves a better efficiency of the magnetic circuit, which is caused, among other things, by the resultant improved possibility of arranging the clapper-type armature relative to the other components of the valve, whereby air gaps that inhibit magnetic flux are largely avoided and only occur between center pole and armature element.

Moreover, the clapper-type armature according to the invention cooperates with the center pole by way of a damping element so that unpleasant noises are prevented when the valve opens and closes. This is particularly important when the electromagnetically actuatable valve is situated in the passenger compartment of a motor vehicle, e.g., in the seats, to vary the seat surface.

The armature element and the valve part are preferably located in a housing. The armature element, the flux concentrating element, the closing element, the spring element as well as the damping element are confined in the housing in pressure-sealed fashion. This can be achieved by pressure-sealed injection of the flux concentrating element. All sensitive components of the valve are therefore protected. The housing can also be designed to be two-piece or multi-piece and be permanently joined by gluing the housing parts together, for example.

In a further preferred embodiment, the electromagnetically actuatable valve has a damping element with a damping stop which absorbs sound, so noise is reduced when the valve opens and closes.

Moreover, the flux concentrating element is preferably designed as a bracket which is situated on the perimeter of the magnetic coil.

In yet another preferred embodiment, the armature element actuates a closing element to open and close the valve, which closing element is designed as an umbrella sealing plug with an umbrella membrane. The umbrella sealing plug is flexible and preferably made out of silicone rubber. As a result, when the clapper-type armature, which is made of iron, strikes the umbrella sealing plug to open the valve, noise is reduced considerably.

The damping element and the closing element can preferably be designed as an integral damping shoe, which also consists entirely of an elastic material such as silicone rubber. This damping shoe can be attached directly to the armature element or it can be injection moulded to it. This embodiment is particularly practical, because the absorption of the sound caused by the striking of the clapper-type armature when the valve opens as well as when it closes can be achieved using the same device, which can be easily and quickly attached to the clapper-type armature by sliding it into place, or it has already been injection moulded to it.

DRAWING

Two preferred embodiments of the clapper-type armature are shown in the drawings, which are explained in greater detail using the description below.

FIG. 1 shows a schematic diagram of a cross-sectional view of the electromagnetically actuatable valve according to the invention, and embodiment of the electromagnetically actuatable valve according to the invention.

FIG. 1 shows a schematic diagram of an electromagnetically actuatable valve 1 in cross section which has a magnet part 2, which includes a coil form 3 on which a magnetic coil 4 is wound, as well as a perpendicular flux concentrating element 5 on the perimeter of the coil form 3, and a center pole 6 situated inside the coil form 3. Moreover, the valve 1 has a valve part 9 having a closing element 11. The closing element 11 for opening and closing the valve 1 cooperates with an armature element 7 on a valve seat 10, whereby the armature element 7 is designed as a clapper-type armature. The armature element is thereby situated on a face of the magnet part perpendicular to the longitudinal axis of the center pole 6 and is connected with the flux concentrating element 5. To open the valve, the armature element 7 is pulled through an induced magnetic field in the direction of the center pole. The closing element is an umbrella sealing plug with an umbrella membrane that makes it possible for a fluid to flow through the valve channel when the armature element 7 is picked up. The umbrella stopper consists of a flexible material such as silicone rubber. Moreover, a head 18 designed on the center pole 6 is provided with a damping element 14 that has a damping stop 13. The armature element 7 is held on a spring element 8 on the side opposite to the side actuating the closing element. The spring element 8 is a spiral-coiled spring that returns the armature element 7 to its position that closes the valve.

The spring element 8, a section of the flux concentrating element 5, the armature element 7, the head of the center pole 18 as well as the closing element 11 are contained in a housing. The housing comprises an upper housing section 16 that touches the coil form 3, and a lower housing section 17 in which two openings 19—one inlet opening and one outlet opening—and the valve seat 10 are located. The upper housing section 16 and the lower housing section 17 are permanently connected with each other and form a pressure-sealed compartment. The valve seat is generally a component of the lower housing 17.

Figure 2:
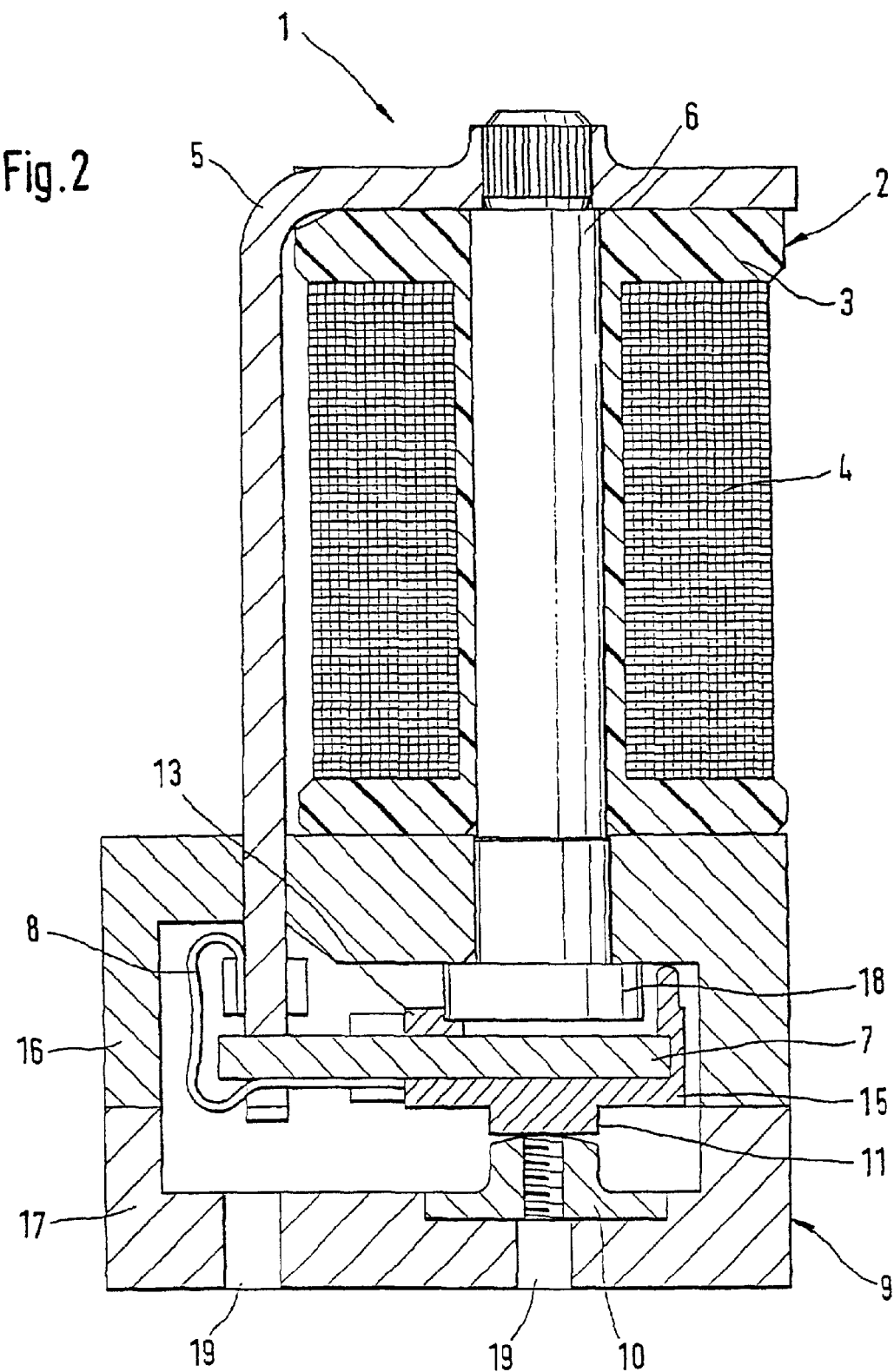

FIG. 2 also shows a schematic diagram of an electromagnetically actuatable valve 1 in cross section, whereby the magnet part of the valve 1 has the same design as the one described in FIG. 1. It differs, however, in that the closing element 11 and the damping stop 13 are designed single-piece as a damping shoe 15. The damping shoe 15 is attached directly to the armature element 7 or it is injection moulded to it. Moreover, a leaf spring is used as the spring element 8, which is attached to an end section of the flux concentrating element 5 extending into the housing and to a section of the armature element 7. The layout of the housing as well as the arrangement of the components of the electromagnetically actuatable valve 1 included therein correspond to those in FIG. 1.

REFERENCE SYMBOL LIST

1 Valve
2 Magnet part
3 Coil form
4 Magnetic coil
5 Flux concentrating element
6 Center pole
7 Armature element
8 Spring element
9 Valve part
10 Valve seat
11 Closing element
12 Face
13 Damping stop
14 Damping element
15 Damping shoe
16 Upper housing section
17 Lower housing section
18 Head
19 Opening

What is claimed is:

1. Electromagnetically actuatable valve (1) comprising a magnet part (2), a moveable armature element (7), a spring element (8), and a valve part (9), whereby the magnet part has at least one magnetic coil (4) wound on a coil form (3), a flux concentrating element (5) and a center pole (6), and the valve part (9) has a closing element (11) that cooperates with the armature element (7) and controls the opening and closing of the valve on a valve seat (10), characterized in that the armature element (7) is designed as a clapper-type armature and cooperates with the center pole (6) by way of a damping element (14), wherein the closing element (11) actuated by the armature element (7) to open and close the valve is an umbrella sealing plug with an umbrella membrane.

2. Valve according to claim 1, wherein the armature element (7) and the valve part (9) are contained in a housing.

3. Valve according to claim 2, wherein the armature element (7), the flux concentrating element (5), the closing element (11), the spring element (8), and the damping element (14) are arranged in the housing in a pressure-sealed compartment.

4. Valve according to claim 1, wherein the damping element (14) has a damping stop (13).

5. Valve according to claim 1, wherein the flux concentrating element (5) is designed as a bracket which is situated on the perimeter of the magnetic coil (4).

6. Valve according to claim 1, wherein the umbrella sealing plug is flexible and, in particular, consists of silicone rubber.

7. Electromagnetically actuatable valve (1) comprising a magnet part (2), a moveable armature element (7), a spring element (8), and a valve part (9), whereby the magnet part has at least one magnetic coil (4) wound on a coil form (3), a flux concentrating element (5) and a center pole (6), and the valve part (9) has a closing element (11) that cooperates with the armature element (7) and controls the opening and closing of the valve on a valve seat (10), characterized in that the armature element (7) is designed as a clapper-type armature being coupled to the flux concentrating element (5) and cooperating with the center pole (6) by way of a damping element (14), wherein the closing element (11) and the damping element (14) are designed as an integral damping shoe (15).

8. Electromagnetically actuatable valve according to claim 7, wherein the armature element (7) designed as a clapper-type armature is coupled to the flux concentrating element (5) by the a-spring element.

9. Electromagnetically actuatable valve according to claim 8, wherein the spring element is a leaf-shaped spring.

* * * * *